(12) United States Patent
Quioc et al.

(10) Patent No.: US 8,678,432 B1
(45) Date of Patent: Mar. 25, 2014

(54) RELEASABLE TETHER RETENTION SYSTEM

(75) Inventors: Eduardo L. Quioc, Westland, MI (US); Bruce A. Stevens, Oakland, MI (US)

(73) Assignee: TK Holdings, Inc., Armada, MI (US)

( * ) Notice: Subject to any disclaimer, the term of this patent is extended or adjusted under 35 U.S.C. 154(b) by 94 days.

(21) Appl. No.: 13/153,339

(22) Filed: Jun. 3, 2011

Related U.S. Application Data

(60) Provisional application No. 61/351,237, filed on Jun. 3, 2010, provisional application No. 61/357,808, filed on Jun. 23, 2010, provisional application No. 61/351,615, filed on Jun. 4, 2010.

(51) Int. Cl.
*B60R 21/2338* (2011.01)

(52) U.S. Cl.
USPC ......... 280/743.2; 280/736; 280/739; 280/742

(58) Field of Classification Search
USPC ................... 280/736, 739, 742, 743.1, 743.2
IPC ..................................................... B60R 21/2338
See application file for complete search history.

(56) References Cited

U.S. PATENT DOCUMENTS

| | | | |
|---|---|---|---|
| 6,371,517 B1 * | 4/2002 | Webber et al. | 280/736 |
| 6,390,501 B1 * | 5/2002 | Greib et al. | 280/743.2 |
| 6,454,300 B1 * | 9/2002 | Dunkle et al. | 280/742 |
| 6,511,094 B2 * | 1/2003 | Thomas et al. | 280/743.2 |
| 6,513,835 B2 * | 2/2003 | Thomas | 280/743.2 |
| 6,634,671 B2 * | 10/2003 | Heigl et al. | 280/743.2 |
| 6,648,371 B2 * | 11/2003 | Vendely et al. | 280/739 |
| 6,918,614 B2 * | 7/2005 | Ryan | 280/743.2 |
| 7,350,734 B2 | 4/2008 | Stevens | 242/374 |
| 7,490,854 B2 * | 2/2009 | Thomas | 280/739 |
| 7,591,482 B2 * | 9/2009 | Thomas et al. | 280/739 |
| 7,695,014 B2 * | 4/2010 | Parks et al. | 280/743.2 |
| 7,762,584 B2 * | 7/2010 | Morita et al. | 280/739 |
| 2006/0192370 A1 * | 8/2006 | Abe et al. | 280/735 |

OTHER PUBLICATIONS

U.S. Appl. No. 13/184,118, filed Jul. 15, 2011 (246).
U.S. Appl. No. 13/153,225, filed Jun. 3, 2011 (243).

* cited by examiner

*Primary Examiner* — Paul N Dickson
*Assistant Examiner* — Laura Freedman
(74) *Attorney, Agent, or Firm* — L.C. Begin & Associates, PLLC

(57) ABSTRACT

The present invention incorporates a tether release system within a conventional airbag system or a conventional vehicle occupant protection system. Release of an associated tether may simultaneously open a vent on an associated airbag. A housing contains an actuator contained within the housing for actuation of the tether release system upon receipt of a crash detection signal, for example. A first moving member is configured for receipt of a propulsive force emanating from the actuator upon actuation of the tether release system. A movable tether release member is contained within the housing wherein the movable tether release member operably communicates with the first moving member upon actuation of the tether release system, for release of an associated tether.

9 Claims, 13 Drawing Sheets

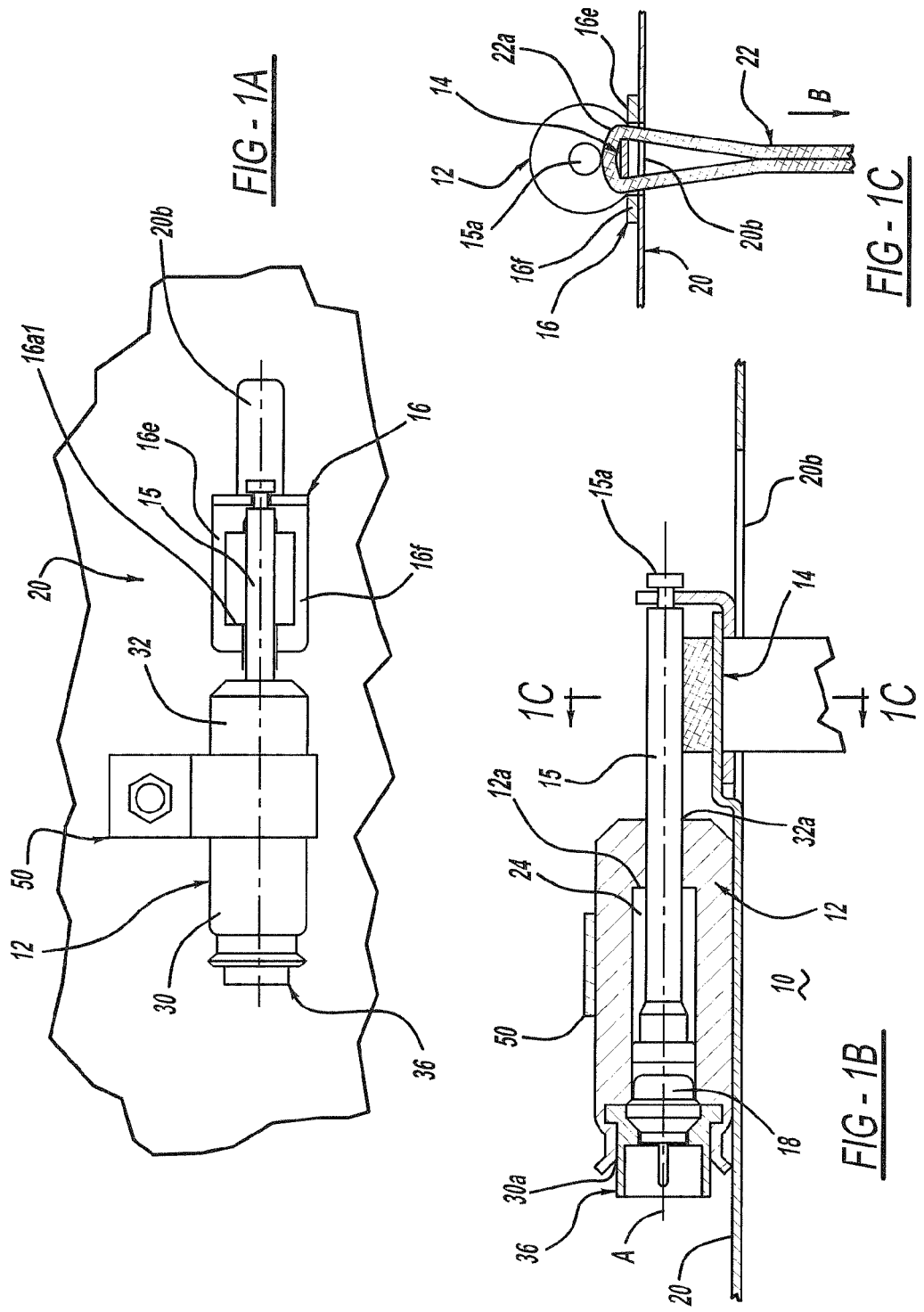

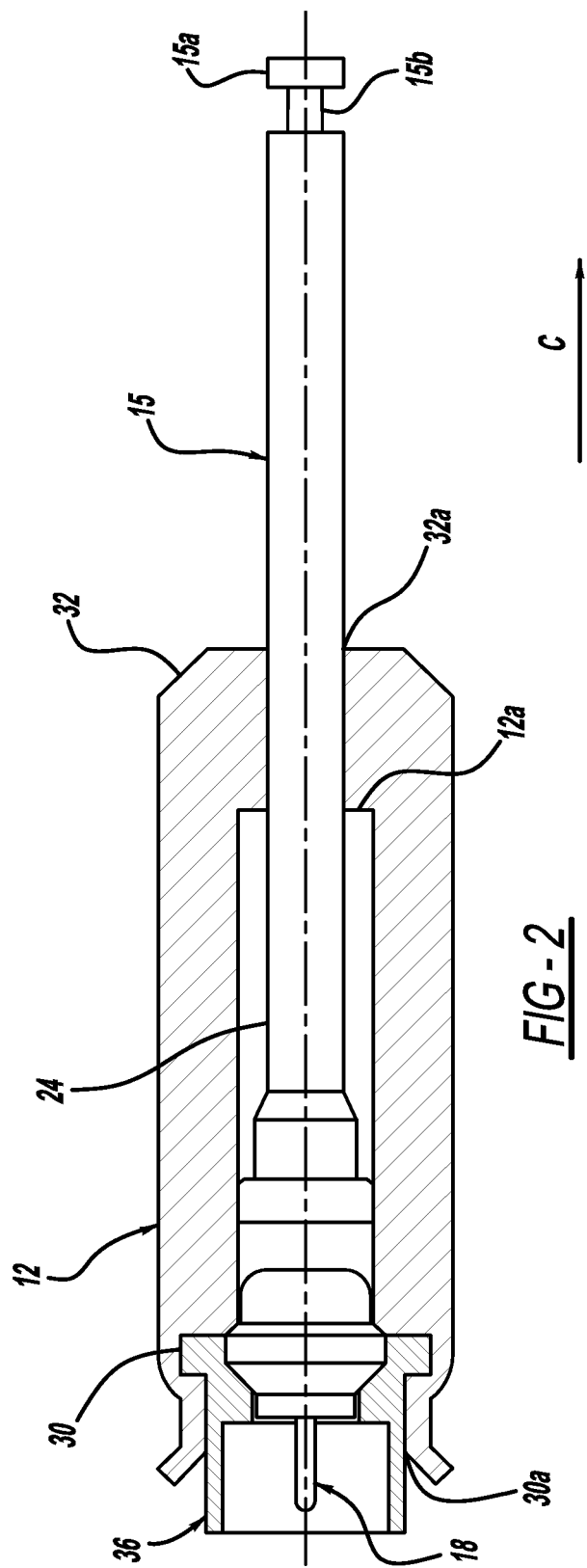

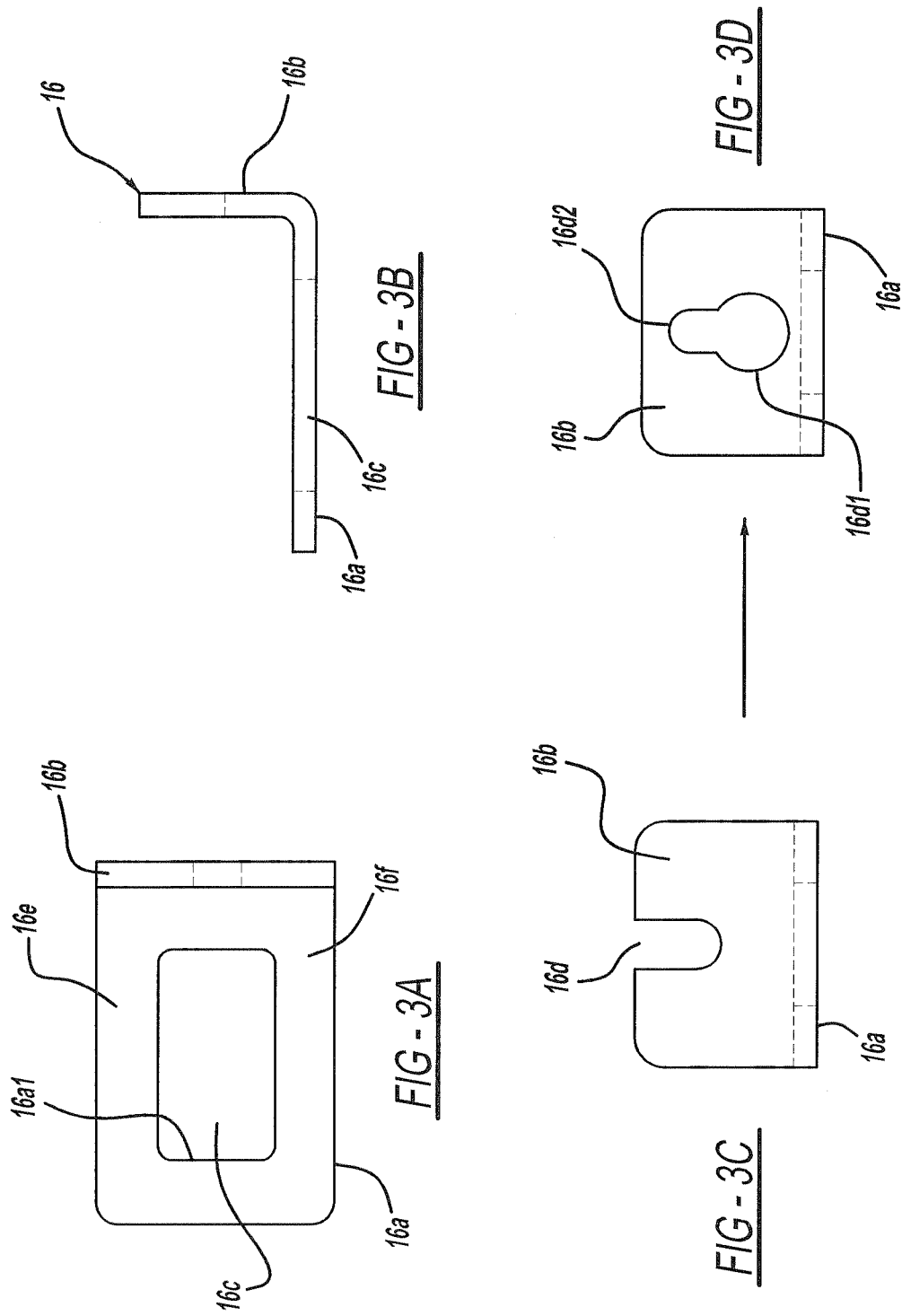

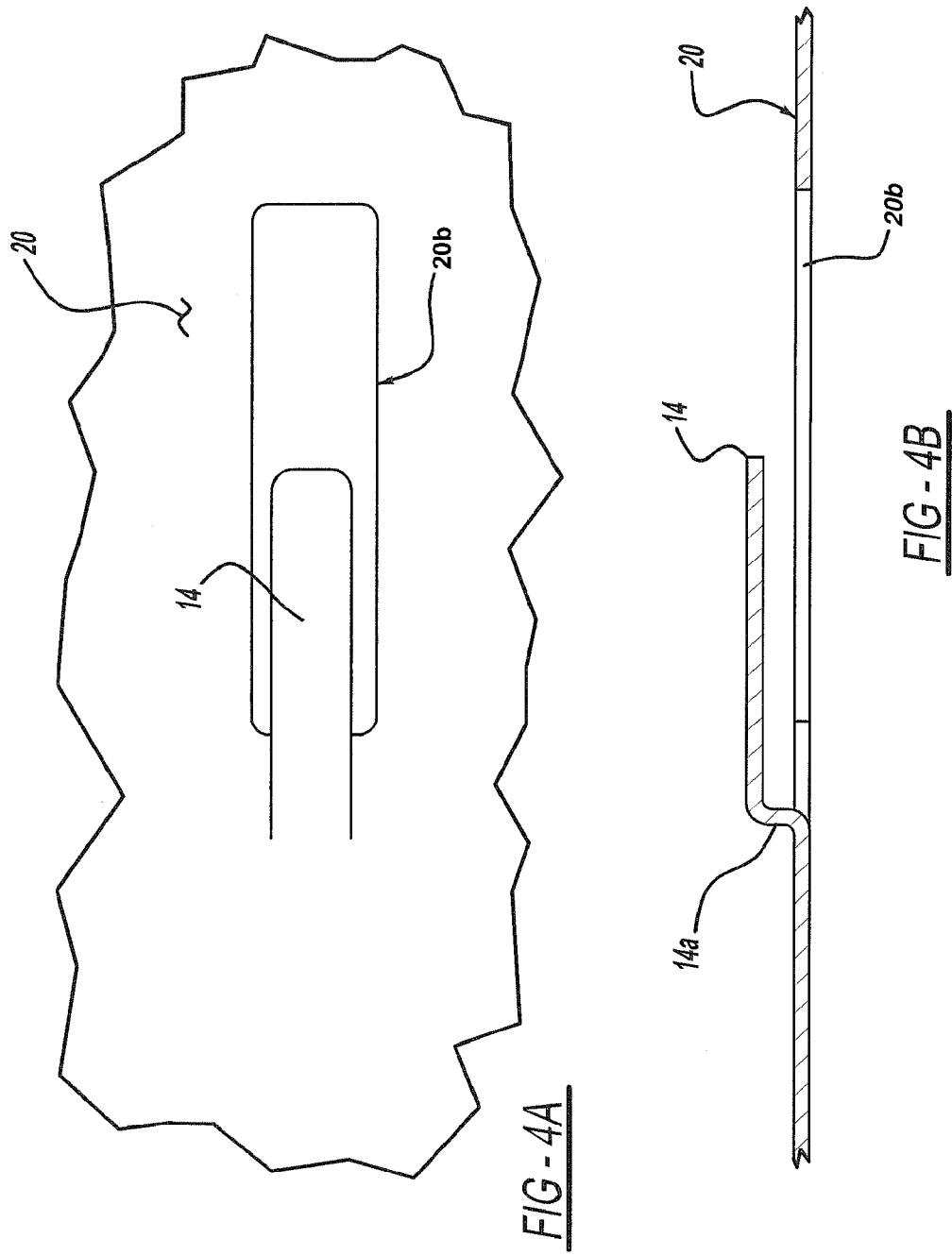

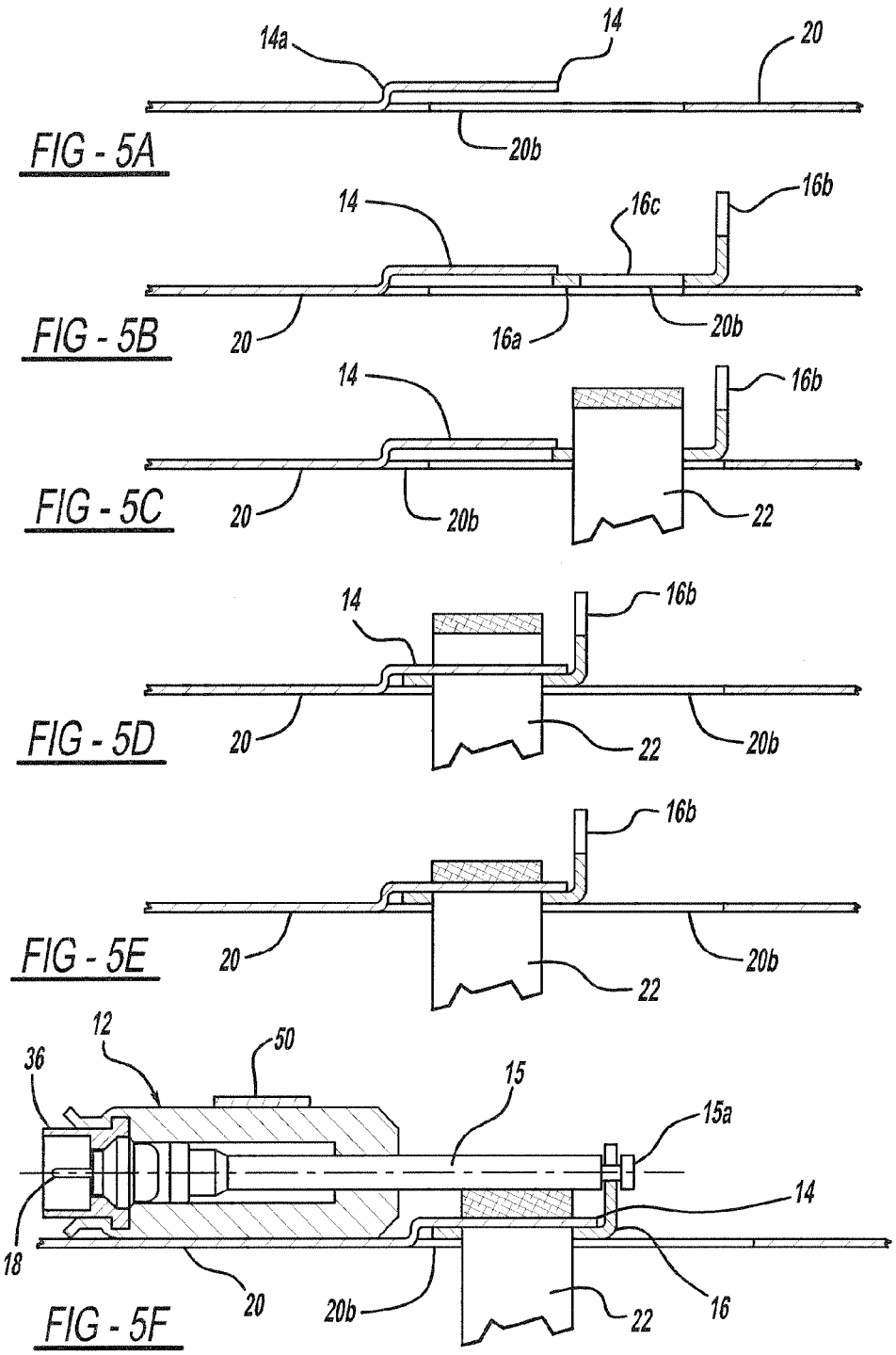

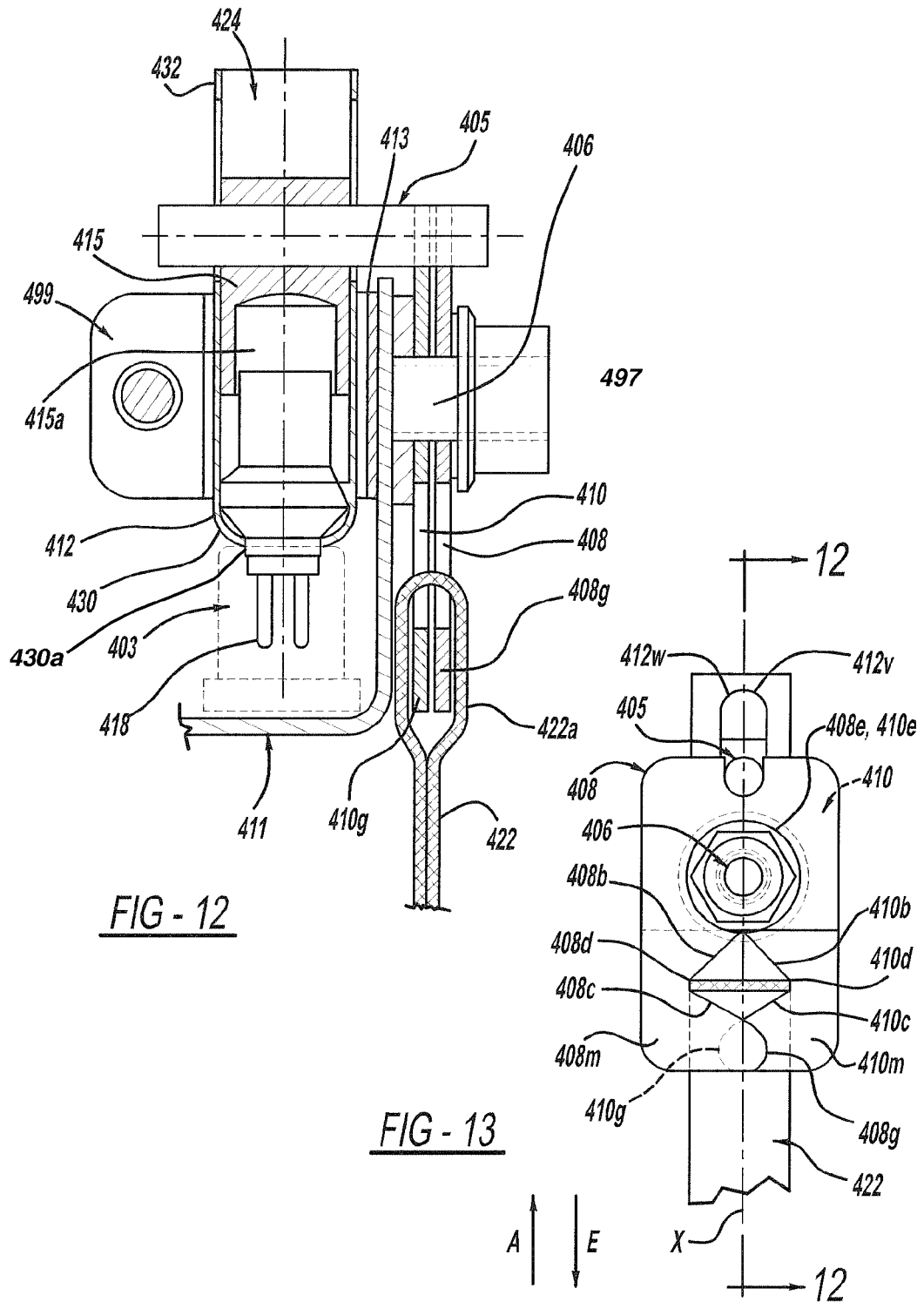

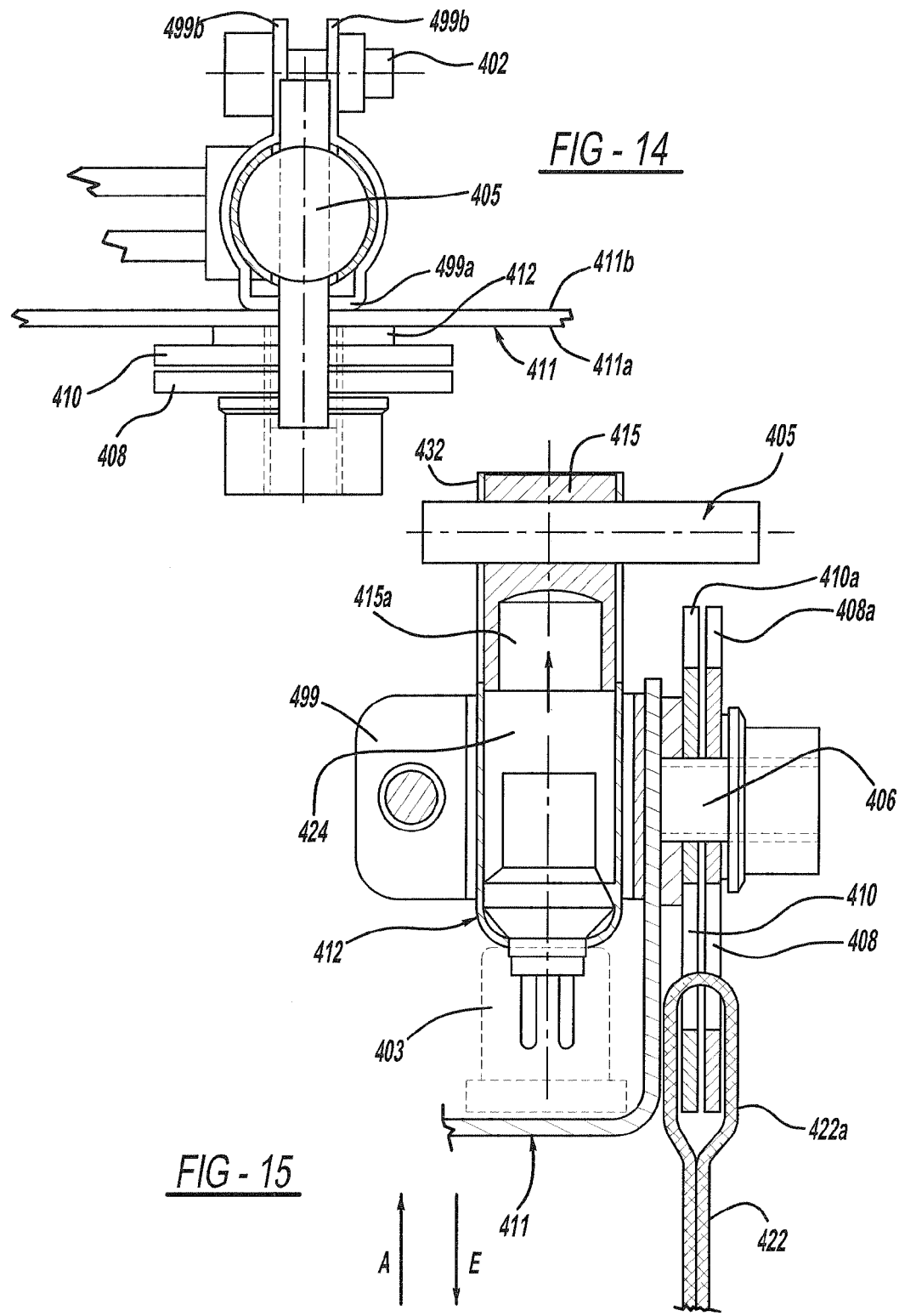

US 8,678,432 B1

RELEASABLE TETHER RETENTION SYSTEM

CROSS-REFERENCE TO RELATED APPLICATIONS

This application claims the benefit of U.S. Application Ser. Nos. 61/351,237, 61/357,808, and 61/351,615, having filing dates of Jun. 3, 2010, Jun. 23, 2010, and Jun. 4, 2010, respectively.

BACKGROUND OF THE INVENTION

Airbags and other pliable and inflatable restraints are being designed using releasable tethers to selectively modify the shape of the restraint, to provide the restraint with enhanced rigidity, and to control venting of the restraint during deployment. In certain embodiments, tension in the tether maintains a valve controlling an airbag vent in a closed position. At some point during or after deployment of the inflatable device, tension in the tether may be relieved to permit actuation of the vent valve and subsequent release of airbag gases.

The embodiments of the present invention provide a releasable tether retention system and if desired, an airbag vent valve actuation mechanism designed to retain at least one end of an extensible tether and to release the tether upon application of an activation signal to an actuator.

SUMMARY OF THE PRESENT INVENTION

The present invention incorporates a tether release system within a conventional airbag system or a conventional vehicle occupant protection system. Release of an associated tether may simultaneously open a vent on an associated airbag designed to deflate or depressurize the airbag once actuated. As described below, the tether is operably supported by the tether release system, prior to actuation of the system.

A housing having a first end and a second end is secured to a base, wherein the base may be integrated within a vehicle component such as a dash board structure, for example. A pyrotechnic, pneumatic, hydraulic, or other functionable actuator is fixed or sealed within the first end of the housing for actuation of the tether release system upon receipt of an electronic or mechanical crash detection signal, from a vehicle algorithm, for example. A first moving member such as a piston or plunger, for example, may be juxtaposed to the actuator within the housing, for receipt of a propulsive force emanating from the actuator upon actuation of the tether release system. A second moving member or a movable tether release member is contained within the housing and juxtaposed to the second end of the housing; the movable tether release member operably communicates and/or cooperates with the first moving member upon actuation of the tether release system, thereby releasing the tether supported by and/or associated with the movable tether release member prior to actuation thereof.

Stated another way, the present invention may be described as a releasable tether retention system including a housing; a retention mechanism operably coupled to the housing; and an element movably mounted within the housing and operatively coupled to the retention mechanism such that the retention mechanism is actuatable by movement of the member from a first position to a second position. It will be appreciated that the retention mechanism is configured to secure a tether thereto when the element is in the first position, and is further configured to release the tether upon movement of the element from the first position to the second position.

It will be appreciated that the aforementioned tether may be released in a variety of methods in accordance with the inventive principles of the present invention, and as exemplified by, but not limited by, the illustrative embodiments described below.

BRIEF DESCRIPTION OF THE DRAWINGS

FIGS. 1A-6C show various views of a releasable tether retention system and associated components thereof in accordance with one embodiment of the present invention.

FIGS. 12-16 show various views of a releasable tether retention system and associated components thereof in accordance with a second embodiment of the present invention.

DETAILED DESCRIPTION OF THE PREFERRED EMBODIMENTS

Figure 1D:
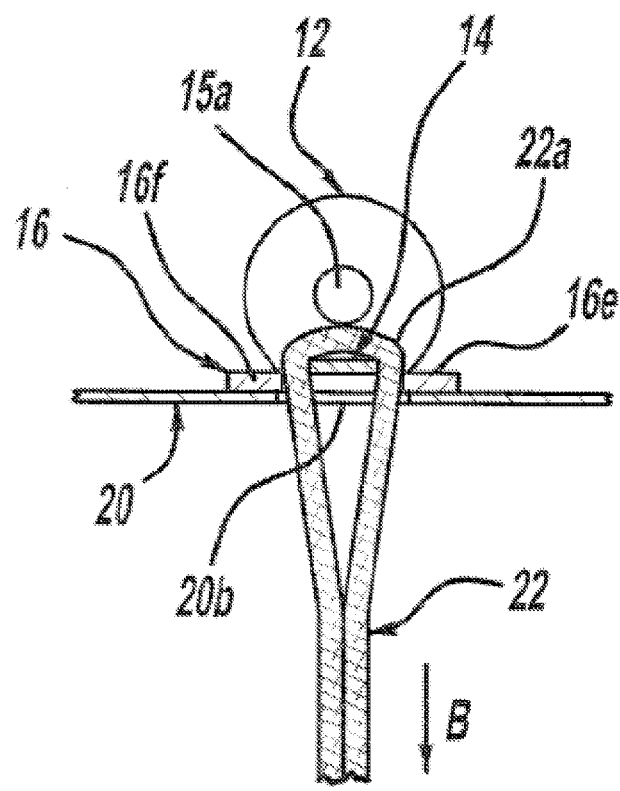
Figure 6A:
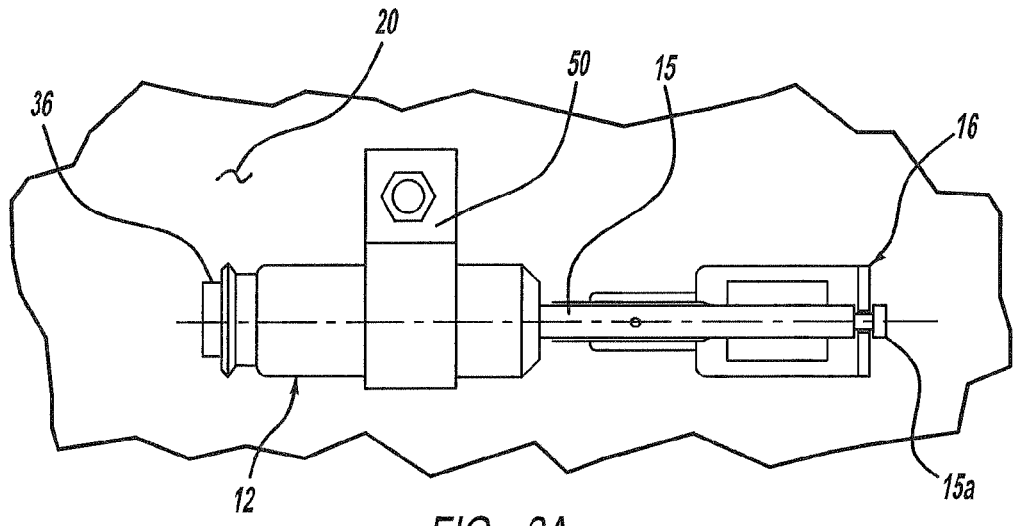
Figure 6B:
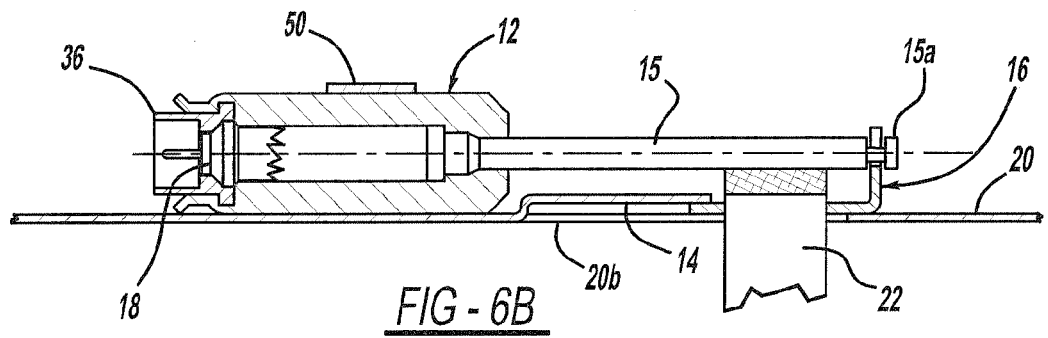
Figure 6C:
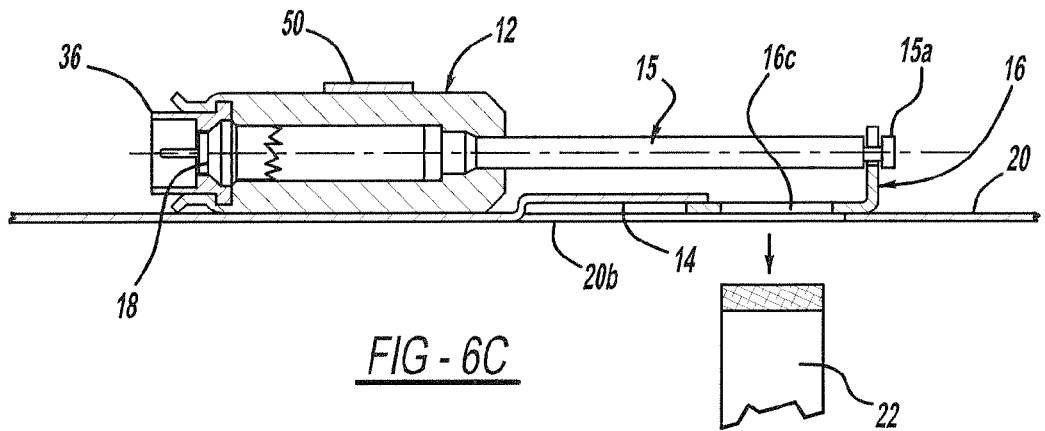

Referring to FIGS. 1A-6C, a releasable tether retention system 10 in accordance with one embodiment of the present invention includes a housing 12, a support element 14, a first movable member 15 slidably mounted in housing 12, a second movable member or sliding element 16 coupled to the first movable member 15, and an actuator 18 operatively coupled to housing 12 for producing a motion of first movable member or piston 15 after receipt of an actuation signal.

Housing 12 has a first end 30 with a first opening 30a and a second end 32 opposite first end 30. The second end 32 includes a second opening 32a. In the embodiment shown, openings 30a and 32a are substantially coaxial along an axis A of the housing. An axial bore 24 extends through housing 12 between first end 30 and second end 32. In a particular embodiment, first end 30 of the housing 12 is configured so as to be crimpable or otherwise deformable to aid in retaining actuator 18 within (or to) housing 12. Housing 12 may include features such as shoulder 12a configured to limit the travel of movable member 15 (described below) within bore 24 during operation of the tether retention system. Housing 12 may be formed using any suitable method from a metallic material or any other suitable material.

A base 20 is provided for mounting of housing 12 thereto. In one embodiment, base 20 comprises an integral portion of a vehicle or other device to which tether retention system 10 is to be attached. In another embodiment, base 20 is formed separately from the vehicle or other element and is attached by welding or any other suitable method to a portion of the vehicle or other device to which the tether retention system is to be secured. Base 20 includes an opening 20b formed therein to permit tether 22 to extend therethrough. Housing 12 is mounted to the base 20 proximate opening 20b. In an alternative embodiment, housing 12 is secured to another portion of the vehicle or device to which the tether retention system is mounted, but is still positioned and secured proximate opening 20b.

A support element 14 is provided for engaging and supporting a portion of a tether 22 prior to release of the tether. Support element 14 is positioned and secured spaced apart from base 20 and the opening 20b formed therein. In the embodiment shown in the drawings, opening 20b is punched or otherwise formed in base 20, and a portion of the base material that occupied opening 20b is formed or otherwise shaped to provide support element 14. In this embodiment, support element 14 is spaced apart from both base 20 and its opening 20b by forming part of the material of support element 14 into a connecting section 14a which joins support element 14 to the remainder of base 20.

In alternative embodiments, support element 14 may be formed separately from base 20 and suitably attached to the base, or the support element may be positioned spaced apart from the base 20 and opening 20b and coupled to an element separate from the base. In a particular embodiment, base 20 and/or support element 14 incorporate a feature or features (not shown) configured to limit the travel of second movable member or sliding element 16 (described below) or first movable member or element 15 (described below). Base 20 may be formed using any suitable method from a metallic material or any other suitable material. Support element 14 may be formed using any suitable method from a metallic material or any other suitable material. As described below, taken together, support element 14 and second movable member or sliding element 16 constitute a releasable tether retention mechanism 14/16 that that when coupled to the housing 12 and first movable member 15, facilitates the retention and subsequent release of an associated tether upon actuation of the system 10.

An actuator 18 is secured to housing first end 30 and extends into bore 24 so as to enable fluid communication between the actuator and bore 24 containing first movable member 15, after activation of the system to release the tether. In one embodiment, actuator 18 is in the form of an electrically-actuated pyrotechnic initiator, or squib, secured within a bore seal 36. Actuator 18 may be formed as known in the art. One exemplary actuator construction is described in U.S. Pat. No. 6,009,809, herein incorporated by reference. Bore seal 36 may be stamped, extruded, cast, machined, or otherwise metal formed and may be made from carbon steel or stainless steel, for example.

Actuator 18 may be secured within bore seal using any of a variety of known methods including, but not limited to, an interference fit, adhesive application, or crimping. Similarly, bore seal 36 may be secured to housing 12 using any of a variety of known methods including, but not limited to, crimping, welding, or adhesive application. In addition, features may be provided for engaging the actuator and/or bore seal with base 20 or a portion of the vehicle or device to which system 10 is mounted, to aid in preventing rotation or other movement of the actuator relative to housing 12 and/or base 20.

In alternative embodiments, actuator 18 may be in the form of a pneumatically or hydraulically actuated valve coupled to an end of housing 12 so as to enable fluid communication between an outlet of the valve and bore 24 upon receipt by the retention system of a suitable activation signal. In these embodiments, activation of the system to release the tether results in opening of the valve to admit a high-pressure fluid into bore 24, resulting in movement of the first movable member 15 as described below. Alternatively, actuator 18 may be positioned remotely from housing 12 but so as to enable fluid communication between the actuator and bore 24 upon receipt by the retention system of a suitable activation signal.

First movable member 15 is configured to slidably move along and within bore 24. In one embodiment, a detent feature (not shown) is provided for ensuring sufficient engagement or interference between the movable member and housing 12 such that movement of the first movable member 15 within bore 24 is prevented prior to activation of the system to release the tether. In the embodiment shown in the drawings, movable member portion 15a has a groove 15b formed therein for engaging a portion of the second movable member or sliding element 16.

In one particular embodiment, the detent feature is in the formed of a knurl, stake, or other deformation (not shown) in a surface of the movable member which engages a wall of the housing defining the bore 24.

In another particular embodiment, the detent feature is formed in the housing, rather than in the movable member 15.

In another particular embodiment, the detent effect is provided by dimensioning the bore diameter and an outer diameter or dimension of the movable member 15 such that a slight interference between the movable member and the housing is provided when the movable member is in a pre-activation position.

In another particular embodiment, the movable member 15 and/or the housing 12 include one or more features configured to produce a slowing of movable member 15 as it approaches housing second end 32 after activation of the system to release the tether. This slowing effect may be provided by dimensioning the bore diameter and an outer diameter or dimension of the movable member 15 such that an interference fit between the movable member and the housing is provided as the movable member approaches housing second end 32. In one example, a diameter of the bore 24 is tapered from a relatively larger dimension to a relatively smaller dimension along the direction of movement of movable member 15, so that slowing of the movable member is relatively gradual. The rate of deceleration of the movable member along bore 24 may be controlled to some degree by the severity of the taper. A portion 15a of movable member 15 extends out of housing 12 to enable coupling of sliding element 16 thereto.

The dimensions of the movable member may also be specified so as to affect the rate of deceleration of the movable member within the housing 12.

First movable member/piston 15 may be formed from a metallic material or any other suitable material.

Second movable member/sliding element 16 has a first portion 16a and a second portion 16b extending from first portion 16a. Portion 16a has an opening 16c formed therein to permit a portion of tether 22 to extend therethrough. Prior to activation of the system 10 to release the tether, first portion 16a is positioned between base 20 and support element 14 such that opening 16c resides between base opening 20b and the support element.

In the embodiment shown in the drawings, second portion 16b has a slot 16d for receiving therein a grooved portion 15a of movable member 15. In this manner, the sliding element 16 is engaged with the movable member 15 so that the sliding element moves in conjunction with the movable member. In one particular embodiment, slot 16d is open-ended to permit the movable member grooved portion 15a to be inserted into the open end.

In another particular embodiment (shown in FIG. 3), the slot has a keyhole-shape, with first section 16d1 configured to permit insertion of an end 15e of the movable member therein, and a second section 16d2 adjoining the first section, for engaging movable member grooved portion 15a. Slot second section is sized to receive movable member grooved portion 15a therein, but also to prevent withdrawal of end 15a therethrough. Thus, end 15a is inserted into first section 16d1 until grooved portion 15a is aligned with second section 16d2. Then grooved portion 15a is inserted into second portion 16d2 to couple the sliding element 16 to movable member 15.

Sliding element or second movable element 16 may be formed from a metallic material or any other suitable material.

As shown in FIG. 1, prior to activation of the system to release tether 22, a looped end 22a of the tether passes through base opening 20b and through sliding element opening 16c and is looped over support element 14. Sliding element second portion 16b and an edge 16a1 of first portion 16a bracket the tether, preventing motion of the tether parallel to axis A and preventing the tether end 22a from sliding off of support element 14. This configuration also ensures that the tether end 22a will move in conjunction with sliding element 16. Referring to FIG. 1D, sliding element opening 16c may also be configured such that forces acting on tether 22 in the direction indicated by arrow "B" in FIG. 1A are transmitted to parts 16e, 16f of first portion 16a on either side of opening 16c, via the portions of the tether squeezed between the support element 14 and parts 16e, 16f. In this manner, parts 16e, 16f act to reinforce support element 14 against tension forces acting on the tether, to aid in preventing bending of the support element.

A securement member 50 (for example, a conventional hold-down strap) may be used to secure the housing 12 to base 20 or to another portion of the vehicle or device to which the system 10 is attached. However, housing 12 may be secured to base 20 by welding or by any other suitable method.

Referring to FIGS. 5A-5F, system 10 may be assembled as follows. Sliding element 16 is positioned in its pre-activation position in relation to base 20. Tether end 22a is then slid through base opening 20b and sliding element opening 16c. Tether portion 22a is then slid over support element 14 and sliding element 16 is slid between the support element and base 20 such that the support element extends into the loop of tether end 22a. Housing 12 with movable member 15 residing therein is then positioned such that the exposed end of the first movable member 15 engages the second movable element or sliding element 16 as previously described. Housing 12 is then secured to base 20 using securement member 50.

Referring to FIGS. 1A-6C, in operation, upon receipt of a signal from a crash sensor or other system activation mechanism, an activation signal is sent to actuator 18. In an embodiment where the actuator is a squib, combustion products from the squib impinge on an end face of movable member 15 in fluid communication with the actuator, forcing the movable member in the direction indicated by arrow "C" in FIG. 2. Sliding element or second movable member 16 moves in conjunction with first movable member 15, forcing the tether looped end 22a (which is trapped between sliding element edge 16a1 and second portion 16b) to move in direction "C". This motion forces the lopped end 22a to slide off of the free end of support element 14. When looped end 22a is disengaged from support element 14, the looped end is free to pass through opening 16c in sliding element 16 and through base opening 20b, thereby freeing the tether.

Figure 17:
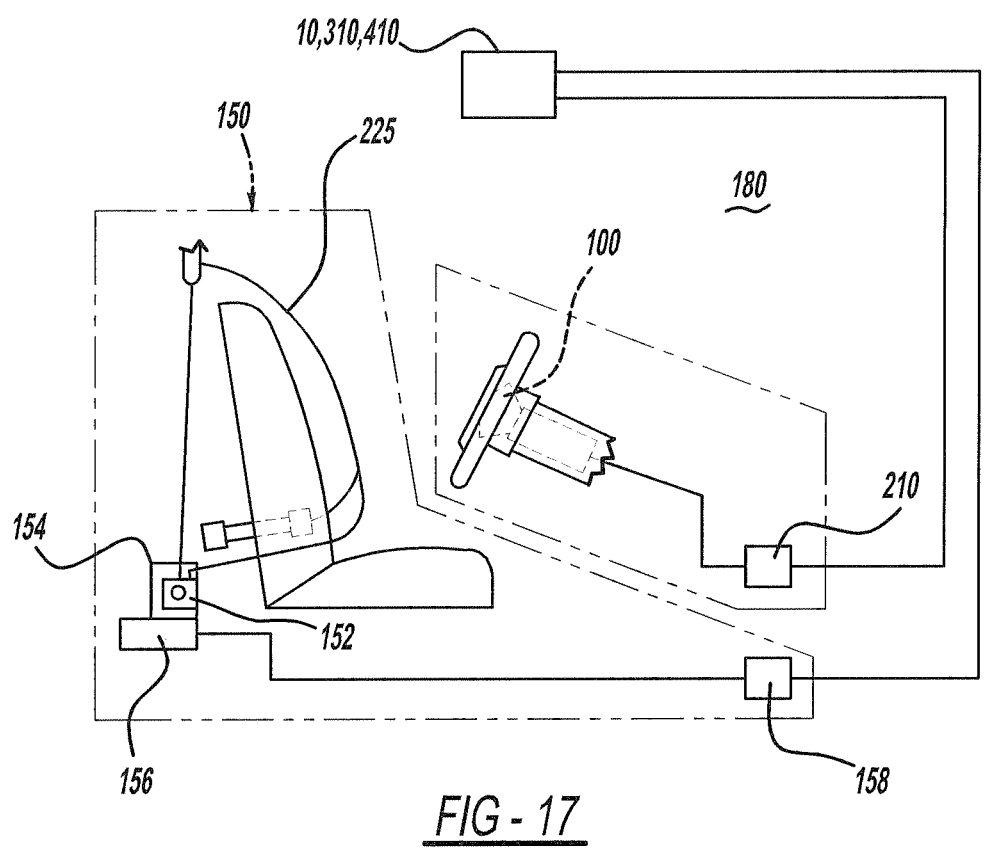
FIG. 17 is a schematic representation of an exemplary vehicle occupant protection system incorporating a releasable tether retention system in accordance with an embodiment of the present invention.

FIG. 17 shows a particular application of a releasable tether retention system 10 in accordance with the present invention. Referring to FIG. 17, the releasable tether retention system 10 is incorporated into a vehicle occupant protection system 180 including additional elements such as, for example, a safety belt assembly 150 and/or an airbag module. FIG. 17 shows a schematic diagram of one exemplary embodiment of such a protection system. Tether retention system 10 may be in operable communication with a crash event sensor 210 which is in communication with a known crash sensor algorithm that signals actuation of the tether release mechanism via activation of actuator 18 based on any desired criteria, for example, the occurrence of a collision event, deployment of a vehicle airbag, the occurrence of a predetermined occupant condition, or any other desired criteria.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners in system 150 are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, incorporated herein by reference, provide illustrative examples of pretensioners actuated in such a manner.

If desired, one or more of sensors 210 and/or 158 may be operatively coupled to valve release mechanism actuator 18 to provide one or more associated inputs prompting activation of the valve release mechanism, depending on such factors as vehicle occupant weight, elapsed time since the occurrence of a collision event, or any other pertinent factors.

In yet other embodiments illustrating the present invention, and referring to FIGS. 7-11, an airbag vent valve actuation mechanism or tether release system 310 in accordance with one embodiment of the present invention includes a housing 312, a first movable member or element 315 slidably mounted in housing 312, an actuator 318 operatively coupled to housing 312 for producing a motion of movable member 315 after receipt of an actuation signal, a link 316 coupled to the first movable member 315, and a second movable member or rotatable element 319 coupled to the link 316 for supporting a tether 322 prior to activation of the valve actuation mechanism. As described below, taken together, the link 316 and second movable member or rotatable element 319 when coupled to the housing 312 and the first movable member or element 315 constitute a releasable tether retention mechanism 316/319 that facilitates the retention and subsequent release of an associated tether upon actuation of the system 310.

Housing 312 has a first end 330 with a first opening 330a and a second end 332 opposite first end 330. The second end 332 includes a second opening 332a. In the embodiment shown, openings 330a and 332a are substantially coaxial along an axis A of the housing. An axial bore 324 extends through housing 312 between first end 330 and second end 332. In a particular embodiment, first end 330 of the housing 312 is configured so as to be crimpable or otherwise deformable to aid in retaining actuator 318 within (or to) housing 312. Housing 312 may include features such a shoulder (not shown) configured to limit the travel of movable member 315 (described below) within bore 324 during operation of the airbag vent valve actuation mechanism.

In another particular embodiment (shown in FIGS. 7-11), a portion of an actuator 318 (described below) extends into and is secured within housing first end 330, and a portion of the actuator extends outside of the housing first end. Housing first end 330 is then secured within a bore seal 336 so as to enclose the portion of the actuator extending from housing end 330. Bore seal may then provide an interface permitting mating of a connector or other suitable signal transmission medium (not shown) with the actuator 318.

Housing 312 may be mounted to any suitable surface, for example, to a portion of a vehicle or device to which the valve actuation mechanism is operatively coupled. In a particular embodiment, the housing is mounted to a base 320 (described below) to which rotatable element 319 (described below) is also mounted. In another embodiment, the mounting surface for housing 312 is formed separately from the vehicle or device and is attached by welding or any other suitable method to a portion of the vehicle or device. Housing 312 is mounted to its mounting surface so as to remain fixed or stationary with respect to base 320. Housing 312 may be formed using any suitable method from a metallic material or any other suitable material.

First movable member or piston 315 is configured to slidably move along and within bore 324. First movable member 315 is positioned either in fluid communication with actuator 318 (described below) or so as to enable fluid communication with the actuator after activation of the valve actuation mechanism. Activation of first movable member 315 in the manner described below produces motion of the movable member within bore 324.

In one embodiment, a detent feature (not shown) is provided for preventing movement of the first movable member 315 within bore 324 prior to activation of the valve actuation mechanism. In one particular embodiment, the detent feature is in the form of a knurl, stake, or other deformation (not shown) in a surface of the movable member which engages a wall of the housing defining the bore 324. In another particular embodiment, the detent feature is formed in the housing, rather than in the first movable member 315.

First movable member 315 may be formed from a metallic material or any other suitable material.

An actuator 318 is secured in housing first end 330 and extends into bore 324 so as to enable fluid communication between the actuator and bore 324 containing piston or first movable member 315, after activation of the valve actuation mechanism. In one embodiment, actuator 318 is in the form of an electrically-actuated pyrotechnic initiator, or squib, secured within bore seal 336 or housing 312. Actuator 318 may be formed as known in the art. One exemplary actuator construction is described in U.S. Pat. No. 6,009,809, herein incorporated by reference. Bore seal 36 may be stamped, extruded, cast, machined, or otherwise metal formed and may be made from carbon steel or stainless steel, for example.

Actuator 318 may be secured within bore seal using any of a variety of known methods including, but not limited to, an interference fit, adhesive application, or crimping. Similarly, bore seal 336 may be secured to housing 312 using any of a variety of known methods including, but not limited to, crimping, welding, or adhesive application. In addition, features may be provided for engaging the actuator and/or bore seal with base 320 or a portion of the vehicle or device to which system 310 is mounted, to aid in preventing rotation or other movement of the actuator relative to housing 312 and/or base 320.

In alternative embodiments, actuator 318 may be in the form of a pneumatically or hydraulically actuated valve coupled to an end of housing 312 so as to enable fluid communication between an outlet of the valve and bore 324 upon receipt by the retention system of a suitable activation signal. In these embodiments, activation of the system to actuation the tether results in opening of the valve to admit a high-pressure fluid into bore 324, resulting in movement of the movable member 315 as described below. Alternatively, actuator 318 may be positioned remotely from housing 312 but so as to enable fluid communication between the actuator and bore 324 upon receipt of a suitable activation signal by the valve actuation mechanism.

A link 316 is coupled to movable member 315 so as to move in conjunction with the movable member. Link 316 is also coupled to a second movable member or rotatable element 319 (using a bolt, rivet, or other suitable mechanism) so as to produce rotation of the rotatable element with respect to the link responsive to motion of the link within housing 312 after activation of the valve actuation mechanism. In the embodiment shown in FIGS. 7-11, a portion of the link 316 is positioned and secured within a complementary cavity formed in movable member 315. Link 316 may be formed from a metallic material or any other suitable material.

Base 320 may be any suitable mounting surface, for example, to a portion of a vehicle or device to which the valve actuation mechanism is operatively coupled. In a particular embodiment, the base 320 is the same surface to which housing 312 is mounted. In another embodiment, base 320 is formed separately from the vehicle or other device and is attached by welding or any other suitable method to a portion of the vehicle or device to which the valve actuation mechanism is to be secured.

Base 320 includes an opening 320b formed therein to permit tether 322 to extend therethrough for engaging rotatable element third portion 319c (described below). In the embodiment shown in the drawings, the second movable member or rotatable element 319 (described below) is rotatably mounted to the base 320 proximate opening 320b. Opening 320b has a first portion 320c over which rotatable member third portion 319c extends prior to system activation and a second portion 320e adjacent first portion 320c and configured for permitting deflection of third portion 319c therein and sliding of tether end 322a from third portion 319c.

One or more features may be provided for restricting rotation of rotatable element 319. In the embodiment shown in FIGS. 7-11, opening 320b is punched or otherwise formed in base 320, and a portion of the base material that occupied opening 320b is formed or otherwise shaped to provide a hard stop 320h for restricting the rotation of rotatable element 319. However, the rotation-restricting feature may be located on rotatable member 319 and configured to engage a portion of base 320, or the rotation-restricting feature may have any of a variety of alternative forms.

Base 320 may be formed using any suitable method from a metallic material or any other suitable material.

Rotatable element 319 is rotatably coupled to link 316, as previously described. Rotatable element 319 is also rotatably mounted to base 320 at using a bolt, rivet, or other suitable rotatable coupling 319r. In the embodiment shown in the drawings, rotatable element 319 has a first portion 319a rotatably coupled to base 320 at rotatable coupling 319r. A second portion 319b extends from first portion 319a and is rotatably coupled to link 316, and a third portion 319c extends from first portion 319a to span base opening first portion 320c for engaging and supporting a portion of a tether 322 prior to release of the tether. Rotatable coupling 319r may comprise a bolt, a rivet, or any other suitable connection configured for rotatably securing the rotatable member 319 to base 320. In an alternative embodiment, rotatable element 319 is rotatably mounted to another portion of the vehicle or device to which the valve actuation mechanism is mounted, but is still located proximate opening 320b.

Figure 8:
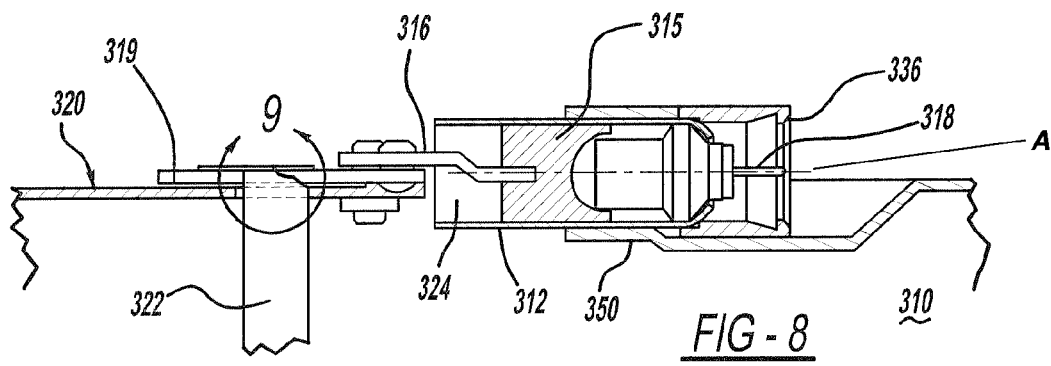

Third portion 319c extends across opening first portion 320c as shown in FIG. 8 such that an end of third portion 319c rests slidably on, or resides slightly spaced apart from, base 320 prior to placement of tether 322 on third portion 319c. This permits the base 320 to support third portion 319c against forces exerted by the tether prior to system activation.

Rotatable element third portion 319c may also have a cross-section that is relatively weaker or less resistant to deformation due to forces exerted on the third portion by the attached tether. This cross-section is configured and positioned for facilitating bending or deformation of the third portion responsive to forces exerted on the third portion by the tether after activation of the valve actuation mechanism and sufficient rotation of rotatable element 319. In the embodiment shown in FIGS. 7-11, the relatively weaker cross-section is provided by a notch 319n (see FIG. 8) formed along a surface of third portion 319c to reduce the cross-sectional area of the third portion in a location where it desired to facilitate bending of the third portion.

Rotatable element 319 may be formed using any suitable method from a metallic material or any other suitable material.

A securement member 350 (for example, a conventional hold-down strap) may be used to secure the housing 312 to base 320 or to another portion of the vehicle or device to which the system 310 is attached. Alternatively, the housing 312 may be welded or otherwise suitably secured to its mounting surface.

Figure 7:
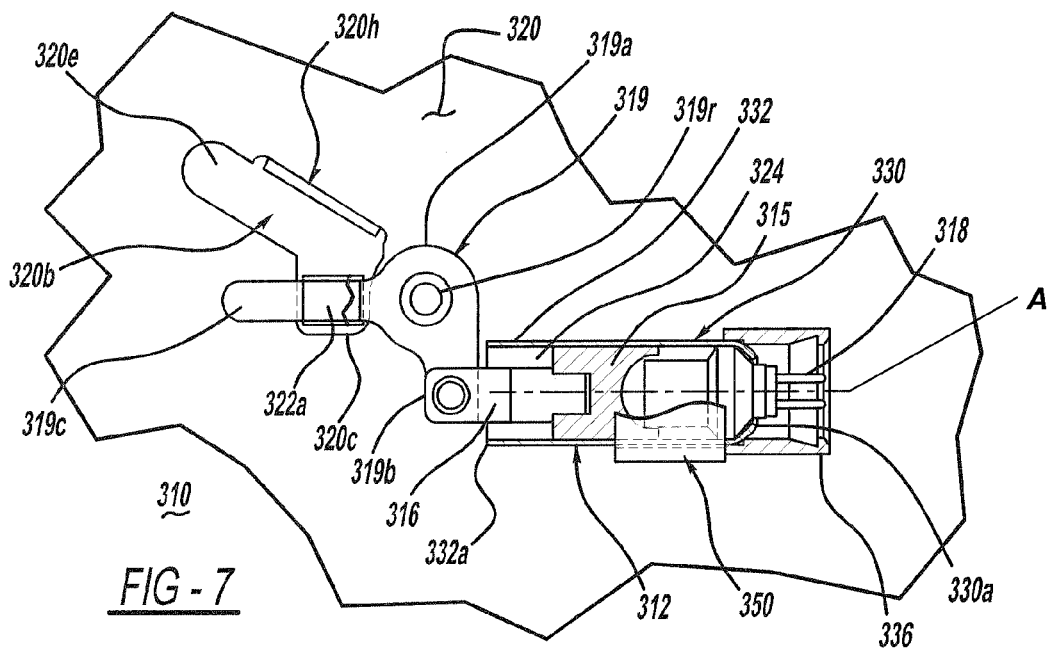
FIGS. 7-11 show various views of a releasable tether retention system and associated components thereof in accordance with a second embodiment of the present invention.
Figure 9:
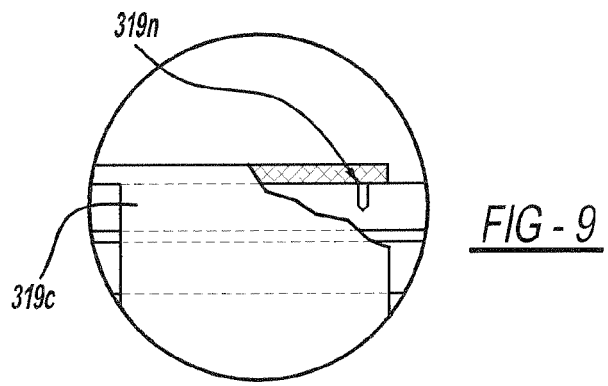

As shown in FIGS. 7, 8, and 9, prior to activation of the system to release tether 322, a looped end 322a of the tether passes through base opening 320b and is looped over rotatable element third portion 319c. In addition, as stated previously, rotatable element third portion 319c rests slidably on, or resides slightly spaced apart from, base portion 320. This permits base portion 320 to support third portion 319c against forces exerted by the tether prior to system activation. Movement of tether end 322a along third portion 319c is constrained by rotatable member first portion 319a and by an edge of base opening first portion 320c.

Figure 10:
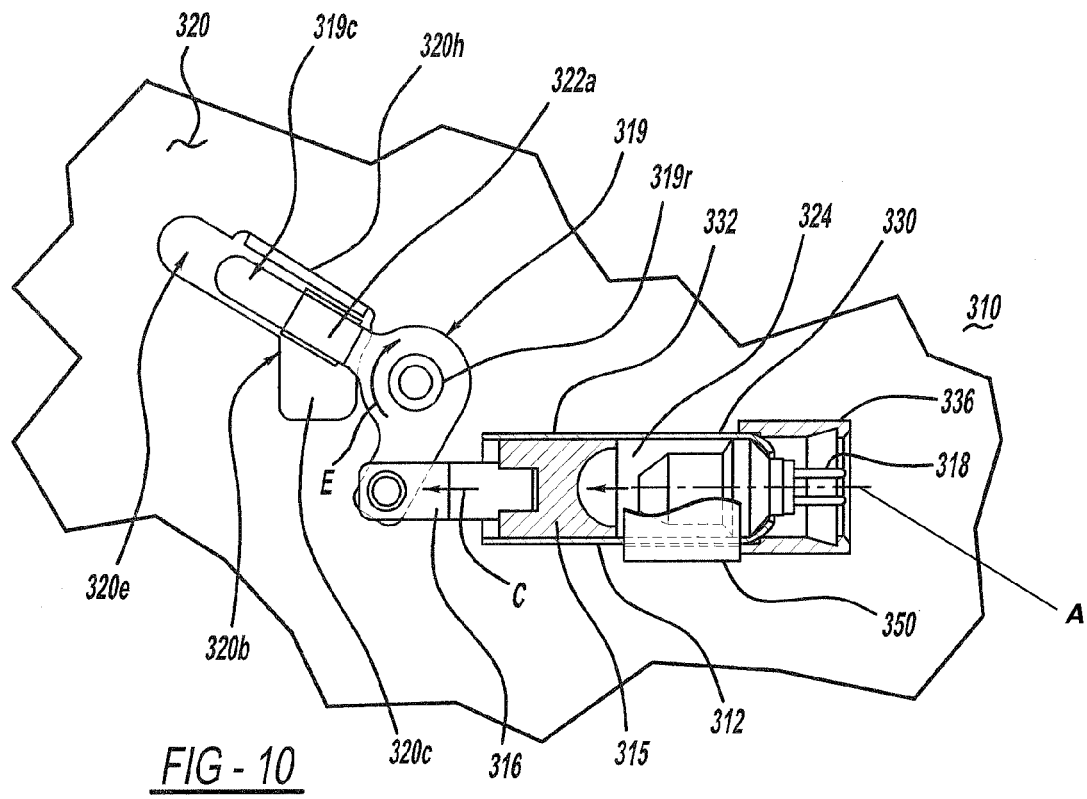
Figure 11:
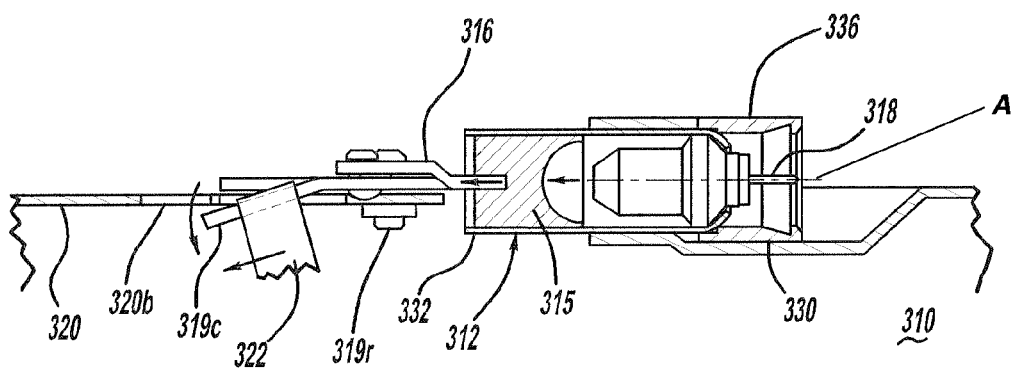

Referring to FIGS. 10 and 11, in operation, upon receipt of a signal from a crash sensor or other system activation mechanism, an activation signal is sent to actuator 318. In an embodiment where the actuator is a squib, combustion products from the squib impinge on an end face of first movable member 315 in fluid communication with the actuator, forcing the first movable member 315 in the direction indicated by arrow "C" in FIG. 10. Movement of the movable member 315 in direction "C" causes the second movable and rotatable member 319 connected to the first movable member 315 to rotate in direction "E" shown in FIG. 10. When third portion 319c has rotated to a position over opening second portion 320e, the third portion 319c is no longer supported by the base 320. The third portion 319c is thus permitted to deflect into opening second portion 320e responsive to forces exerted by the tether, allowing tether end 322a to slide off a free end of the third portion as shown in FIG. 11.

In one embodiment, the tether 322 is operatively coupled to a valve (not shown) controlling a flow of inflation gases from a vent of an airbag (also not shown). The mechanism is structured so that the valve remains closed while the tether end 322a is engaged with rotatable member third portion as shown in FIGS. 7 and 8. Activation of any of the valve actuation mechanism embodiments described herein produces rotation of the rotatable member and release of tether end 322a as just described. As tether end 322a begins to slide off of rotatable member third portion 319c, tension in the tether starts to relax, permitting the valve to open and allowing release of inflation gases from the airbag.

Embodiments of the valve actuation mechanism disclosed herein may be activated to permit release of gases from the airbag in situations where a smaller or lighter vehicle occupant is present during a crash situation. Release of a portion of the gases from the inflated airbag provides a relatively softer, less rigid cushion for the lighter vehicle occupant.

FIG. 17 shows a particular application of a valve actuation mechanism 310 in accordance with the present invention. Referring to FIG. 17, the valve actuation mechanism may be incorporated into a vehicle occupant protection system 180 including additional elements such as, for example, a safety belt assembly 150 and/or an airbag module. FIG. 17 shows a schematic diagram of one exemplary embodiment of such a protection system. valve actuation mechanism 310 may be in operable communication with a crash event sensor 210 which is in communication with a known crash sensor algorithm that signals actuation of the valve actuation mechanism via activation of actuator 18 based on any desired criteria, for example, the occurrence of a collision event, deployment of a vehicle airbag, the occurrence of a predetermined occupant condition, or any other desired criteria.

In yet another embodiment of the invention, FIGS. 12-16 show an airbag vent valve actuation mechanism or tether release system 497 in accordance with the present invention An actuator housing 412 has a first end 430 with a first opening 430a and a second end 432 opposite first end 430. In one embodiment, the housing 412 is generally cylindrical, although a housing having any of a variety of alternative cross-sectional shapes may be used. An axial bore 424 extends through housing 412 between first end 430 and second end 432. Bore 424 is configured for slidably receiving an actuator 418 therein, as described below. A wall (or walls) of housing 412 includes opposed, elongated slots 412v formed therein. Slots 412v are configured for receiving therein a portion of a locking pin 405 (described below) to enable the received portions of the pin to sliding within the slots 412v or along edges of the slots. After activation of the valve actuation mechanism, one or more end portions 412w of the slots 412v may serve as hard stops, limiting travel of pin 405 in the direction indicated by arrow A.

In a particular embodiment, first end 430 of the housing 412 is configured so as to be crimpable or otherwise deformable to aid in retaining actuator 418 within (or to) housing 412. In another particular embodiment, an end of the housing is shaped so as to receive the actuator therein or so as to facilitate retention of the actuator therein.

Housing 412 may include features such a shoulder (not shown) configured to limit the travel of a movable member 415 (described below) within bore 424 during operation of the airbag vent valve actuation mechanism. Housing 412 may be mounted to any suitable surface, for example, to a portion of a vehicle or device to which the valve actuation mechanism is operatively coupled. Housing 412 is mounted to its mounting surface so as to remain fixed or stationary with respect to the mounting surface. Housing 412 may be formed using any suitable method from a metallic material or any other suitable material.

A base 411 may be provided for mounting of housing 412 and other elements of the system 410 thereon. Base 411 may be formed by a portion of a vehicle or other device on which the mechanism 410 is mounted. Alternatively, base 411 may be in the form of a stand-alone bracket or other structure which may be welded or otherwise suitably attached to a portion of the vehicle or device. In one embodiment, base 411 is configured so as to provide a clearance between the base and locking pin 405 (described below) when the locking pin is mounted in first movable member 415. Base 411 may be formed using any suitable method from a metallic material or any other suitable material.

In the embodiment shown in FIGS. 12-16, housing 412 is secured to base 411 using a clamp 499 coupled to base 411. However, the housing 412 may be secured to the base 411 or to the vehicle or other device using any other suitable method.

Clamp 499 may be secured to base 411 using welding, riveting, or any other suitable method. Clamp 499 has a base portion 499a and a pair of opposed arms 499b extending from the clamp base portion to form a cavity therebetween. Arms 499b are configured to facilitate gripping or engagement of actuator housing 412 when the housing is positioned between the arms 499b, thereby securing the housing 412 within the cavity.

The housing may be clamped or secured between the arms 499b by forcing end portions of arms toward each other after housing 412 is inserted into the cavity between the arms, until a desired engagement force is achieved. Then the arms 499b are secured in the engagement position using a bolt 402 or other suitable means.

Clamp 499 may be formed using any suitable method from a metallic material or any other suitable material.

An actuator 418 is secured in housing first end 430 and extends into bore 424 so as to enable fluid communication between the actuator and bore 424 containing movable member 415, after activation of the valve actuation mechanism. In one embodiment, actuator 418 is in the form of an electrically-actuated pyrotechnic initiator, or squib, secured within a bore seal (not shown) or housing 412. Actuator 418 may be formed as known in the art. One exemplary actuator construction is described in U.S. Pat. No. 6,009,809, herein incorporated by reference.

In the embodiment shown in FIGS. 12-16, a portion of actuator 418 extends into and is secured within housing first end 430, and a portion of the actuator extends outside of the housing first end to enable mating of a connector 403 or other suitable signal transmission medium with the actuator 418.

The actuator 418 may be secured within a bore seal (not shown) mountable within housing 412 so as to provide a substantially gas-tight seal between the housing 412 and the bore seal, and also between the bore seal and the actuator 418. Actuator 418 may be secured within the bore seal using any of a variety of known methods including, but not limited to, an interference fit, adhesive application, or crimping. Similarly, the bore seal may be secured to housing 412 using any of a variety of known methods including, but not limited to, crimping, welding, or adhesive application. Alternatively, the actuator 418 may be secured within housing 412 using an adhesive suitable for providing the desired seal. Other methods of mounting the actuator 418 in or to housing 412 and for providing the desired seal are also contemplated.

In addition, features may be provided for engaging the actuator and/or bore seal with base 420 or a portion of the vehicle or device to which system 497 is mounted, to aid in preventing rotation or other movement of the actuator relative to housing 412 and/or base 420.

In alternative embodiments, actuator 418 may be in the form of a pneumatically or hydraulically actuated valve coupled to an end of housing 412 so as to enable fluid communication between an outlet of the valve and bore 424 upon receipt by the valve actuation mechanism of a suitable activation signal. In these embodiments, activation of the mechanism to release the tether results in opening of the valve to admit a high-pressure fluid into bore 424, resulting in movement of the movable member 415 as described below. Alternatively, actuator 418 may be positioned remotely from housing 412 but so as to enable fluid communication between the actuator and bore 424 upon receipt of a suitable activation signal by the valve actuation mechanism.

A first movable member 415 is configured to slidably move along and within bore 424. In the embodiment shown in FIGS. 12-16, member 415 has a cavity 415a configured for receiving a portion of actuator 418 therein when the valve actuation mechanism is in a pre-activation state. Member 415 also includes a through hole 415b formed therein for receiving a locking pin 405 therethrough. Pin 405 forms an interference fit with edges of hole 415b or is otherwise secured within hole 415b so as to ensure motion of the pin 405 in correspondence with movable member 415.

Movable member is positioned either in fluid communication with actuator 418 (described below) or so as to enable fluid communication with the actuator after activation of the valve actuation mechanism. Activation of movable member 415 in the manner described below produces motion of the movable member within bore 424.

In one embodiment, a detent feature (not shown) is provided for preventing movement of the movable member 415 within bore 424 prior to activation of the valve actuation mechanism. In one particular embodiment, the detent feature is in the form of a knurl, stake, or other deformation (not shown) in a surface of the movable member which engages a wall of the housing defining the bore 424. In another particular embodiment, the detent feature is formed in the housing, rather than in the movable member 415.

Movable member 415 may be formed from a metallic material or any other suitable material.

Locking pin 405 extends through movable member opening 415b and also through housing 412 to project from both of opposed housing slots 12v. Pin 405 is dimensioned so as to extend from housing 12 a sufficient amount to engage portions of arms 408 and 410 when the valve actuation mechanism is in a pre-activation state, as described below. Pin 405 may be formed from a metallic material or any other suitable material.

A mounting member 406 is coupled to housing 412 to enable a pair of actuating arms 408 and 410 to be rotatably mounted thereon. Arms 408 and 410, may when taken together be considered as a second movable member 408/410. In one embodiment, the mounting member is in the form of a stud or shaft portion secured to a side 411a of base 411 opposite the side 411b along which clamp 499 is mounted. In another embodiment, the mounting member is secured directly to the housing 412. However, the mounting member may be secured to any other suitable surface.

Arms 408 and 410 are mounted in a stacked fashion on mounting member 406 so as to enable free rotation of the arms about the mounting member when the arms are not constrained in positions securing tether 422, as described below. If desired, pads or spacers (for example, in the form of washers such as a washer 413) may be positioned along mounting member 406 between arm 408 and base 411 and/or between arm 408 and arm 410, to facilitate smooth, low-friction motion of arm 408 relative to base 411 and of arms 408 and 410 relative to each other. The spacers may be formed from any suitable material having a low coefficient of friction relative to the material (or materials) from which arms 408 and 410 and base 411 are formed.

In the embodiment shown in FIGS. 12-16, arm 408 has a notch 408a formed proximate an end thereof and configured for receiving therein a portion of locking pin 405 when the valve actuation mechanism is in a pre-activation state. A through hole 408e is formed through a body of the arm 408 to enable rotatable mounting of the arm on mounting member 406. Arm 408 also includes a pair of sloped surfaces 408*b*, 408*c* which converge to define a well 408*d* configured for receiving therein a looped portion of a tether 422 when the valve actuation mechanism is in a pre-activation state. The portion of arm 408 including surfaces 408*b* and 408*c* terminates in a rounded end 408*g* and defines a "claw" 408*m* which extends in a first direction across an axis X passing through a center of mounting hole 408*e*.

Arm 410 has a notch 410*a* formed proximate an end thereof and configured for receiving therein a portion of locking pin 405 when the valve actuation mechanism is in a pre-activation state. A through hole 410*e* is formed through a body of the arm 410 to enable rotatable mounting of the arm on mounting member 406. Arm 410 also includes a pair of sloped surfaces 410*b*, 410*c* which converge to define a well 410*d* configured for receiving therein a looped portion of a tether 422 when the valve actuation mechanism is in a pre-activation state. The portion of min 410 including surfaces 410*b* and 410*c* terminates in a rounded end 410*g* and defines a "claw" 410*m* which extends across axis X passing through a center of mounting hole 410*e*. Claw 410*m* extends across axis X in a second direction substantially opposite the first direction.

As seen in FIG. 13, well 410*d* formed by surfaces 410*b* and 410*c* opens in a direction opposite to that in which the well 408*d* opens. In addition, claws 408*m* and 410*m* are configured so as to overlap across axis X when the valve actuation mechanism is in a pre-activation state. In this configuration, the looped portion 422*a* of tether 422 is wrapped over the overlapping claws of the arms 408, 410 and extends into wells 408*d* and 410*d*. The overlapping claws thus secure the tether 422 to the valve actuation mechanism prior to system activation.

Arms 408 and 410 are configured so that claws 408*m* and 410*m* are in an overlapping state when the arms are rotated such that notches 408*a* and 410*a* are aligned with each other so as to permit insertion of locking pin 405 into both notches. Positioning of pin 405 within notches 408*a* and 410*a* maintains the claws in an overlapping state by preventing rotation of the arms. Arms 408 and 410 may be secured to mounting member 406 using a nut or other fastener, or by any other suitable method. Arms 408 and 410 may be formed using any suitable method from a metallic material or any other suitable material.

As described above, and when taken together, the arms 408 and 410 and the associated features when coupled to the housing 412 through mounting member 406 and the first movable member or element 415 constitute a releasable tether retention mechanism 408/410 that facilitates the retention and subsequent release of an associated tether upon actuation of the system 497.

As shown in FIGS. 12 and 13, prior to activation of the system to release tether 422, a looped end 422*a* of the tether passes through the mechanism as shown in FIGS. 12-16, with locking pin 405 residing in notches 408*a* and 410*a* of arms 408 and 410. In addition, a certain amount of tension force is present in the tether which tends to pull the tether away from the mechanism 497, in the general direction indicated by arrow "E".

Figure 16:
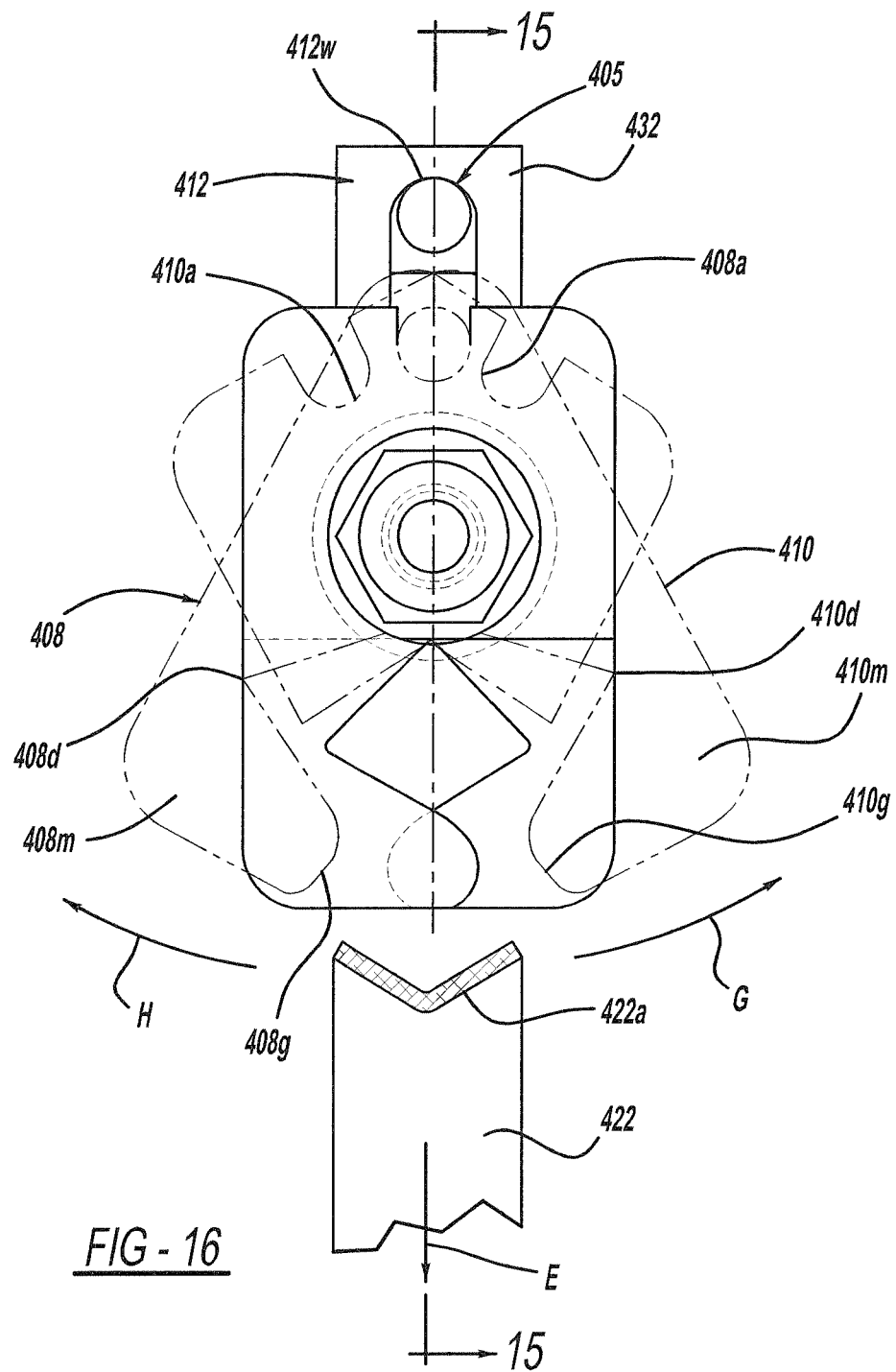

Referring to FIGS. 14-16, upon receipt of a signal from a crash sensor or other system activation mechanism (not shown), an activation signal is sent to actuator 418. In an embodiment where the actuator is a squib, combustion products from the squib impinge on an end face of first movable member 415 in fluid communication with the actuator 418, forcing the movable member 415 in the direction indicated by arrow "A" in FIG. 13. Movement of the first movable member 415 in direction "A" causes the locking pin 405 to be extracted from notches 408*a* and 410*a*. This releases the rotational constraints on arms 408 and 410. The tether tension force in direction pulls on the arm ends 408*g* and 410*g* along surfaces 408*c* and 410*c*, causing them to rotate outwardly about mounting member 406, in the directions indicated by arrows "G" and "H". As rotation of the arms continues and the ends of the arms continue to separate, the tether looped portion 422*a* eventually slides down surfaces 4108*c* and 410*c* and over the curved ends of arms 408 and 410, slipping free of the mechanism.

In one embodiment, the tether 422 is operatively coupled to a valve (not shown) controlling a flow of inflation gases from a vent of an airbag (also not shown). The system is structured so that the valve remains closed while the tether end 422*a* is engaged with mechanism 410. Activation of any of the valve actuation mechanism embodiments described herein produces rotation of the arms 408 and 410 and release of tether end 422*a* as just described. As tether end 422*a* begins to slide off of arms 408 and 410, tension in the tether starts to relax, permitting the valve to open and allowing release of inflation gases from the airbag.

Embodiments of the valve actuation mechanism disclosed herein may be activated to permit release of gases from the airbag in situations where a smaller or lighter vehicle occupant is present during a crash situation. Release of a portion of the gases from the inflated airbag provides a relatively softer, less rigid cushion for the lighter vehicle occupant.

FIG. 17 shows a particular application of a valve actuation mechanism 410 in accordance with the present invention. Referring to FIG. 17, the valve actuation mechanism may be incorporated into a vehicle occupant protection system 180 including additional elements such as, for example, a safety belt assembly 150 and/or an airbag module. FIG. 17 shows a schematic diagram of one exemplary embodiment of such a protection system. valve actuation mechanism 10 may be in operable communication with a crash event sensor 210 which is in communication with a known crash sensor algorithm that signals actuation of the valve actuation mechanism via activation of actuator 18 based on any desired criteria, for example, the occurrence of a collision event, deployment of a vehicle airbag, the occurrence of a predetermined occupant condition, or any other desired criteria.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743, 480, 5,553,803, 5,667,161, 5,451,008, 4,558,832 and 4,597, 546, incorporated herein by reference. Illustrative examples of typical pretensioners in system 150 are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, incorporated herein by reference, provide illustrative examples of pretensioners actuated in such a manner.

If desired, one or more of sensors 210 and/or 158 may be operatively coupled to valve actuation mechanism actuator 18 to provide one or more associated inputs prompting activation of the valve actuation mechanism, depending on such factors as vehicle occupant weight, elapsed time since the occurrence of a collision event, or any other pertinent factors.

It should be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention, but should be interpreted to encompass the full range of literal and equivalent embodiments with regard to the appended claims.

What is claimed is:

1. A tether release system comprising:
a housing containing a first end and a second end, and an axial bore;
a first movable member contained within said housing, and structured to slidably travel within said axial bore upon actuation of said tether release system;
a second movable member structured to operably communicate with said first movable member upon actuation of said tether release system, a first portion of the second movable member including a first side, a second side opposite the first side and facing the first movable member, and an opening structured to permit passage of a portion of a tether from the first side through the opening to the second side prior to actuation of said system;
an actuator fixed within said first end of said housing and adapted to operably communicate with said first movable member upon actuation of said tether release system; and
a tether retainer structured to operably communicate with said second movable member upon actuation of said system,
wherein said second movable member is configured to release an associated tether upon actuation of said tether release system.

2. The tether release system of claim 1 further comprising a base attachable to the housing and structured so as to enable attachment of the housing to a vehicle or other device via the base, and wherein said tether retainer comprises a support element formed from a portion of the base.

3. The tether release system of claim 1 further comprising a base attachable to the housing and structured so as to enable attachment of the housing to a vehicle or other device via the base, wherein said second movable member slidably engages said base upon actuation of said tether release system.

4. The tether release system of claim 1 further comprising a base attachable to the housing and structured so as to enable attachment of the housing to a vehicle or other device via the base, and wherein the first side of the second movable member first portion is structured to be slidable along the base upon actuation of the tether release system.

5. The tether release system of claim 1 wherein the second movable member opening has a pair of opposed edges and is sized with respect to the tether retainer such that a portion of the tether is supported by at least one edge of the pair of edges along the second side of the first portion of the second movable member.

6. A releasable tether retention system comprising:
a housing;
a base attachable to the housing and structured so as to enable attachment of the housing to a vehicle or other device via the base;
a support element operably coupled to the housing and structured for supporting a tether; and
a movable element mounted within the housing and operatively coupled to the support element such that the movable element is movable from a first position to a second position,
wherein the system is configured to secure the tether to the support element when the movable element is in the first position,
and configured such that movement of the movable element from the first position to the second position forces the tether to disengage from the support element,
wherein the support element is formed from a portion of said base, and
wherein the movable element includes:
a first movable member slidably mounted in the housing, and
a second movable member engaged with said first movable member,
said second movable member being slidably engageable with said base upon actuation of said releasable tether retention system.

7. A tether release system comprising:
a housing containing a first end and a second end, and an axial bore;
a base attachable to the housing and structured so as to enable attachment of the housing to a vehicle or other device via the base,
a first movable member contained within said housing, and adapted to slidably travel within said axial bore upon actuation of said tether release system;
a second movable member adapted to operably communicate with said first movable member upon actuation of said tether release system; and
a support element coupled to the housing and structured to engage a tether to support the tether thereon,
wherein said second movable member is structured to exert a force on the tether when supported on the support element, the force being sufficient to remove the tether from engagement with the support element upon actuation of said tether release system, and
wherein the system is structured such that the second movable member is positioned between the support element and the base prior to activation of the tether release system to release the tether.

8. A releasable tether retention system comprising:
a housing;
a base attachable to the housing and structured so as to enable attachment of the housing to a vehicle or other device via the base;
a support element operably coupled to the housing and structured for supporting a tether; and
a movable element mounted within the housing and operatively coupled to the support element such that the movable element is movable from a first position to a second position,
wherein the system is configured to secure the tether to the support element when the movable element is in the first position,
and configured such that movement of the movable element from the first position to the second position forces the tether to disengage from the support element,
wherein the base includes an opening structured to receive a portion of the tether therethrough for attachment to the support element prior to activation of the releasable tether retention system to release the tether.

9. The releasable tether retention system of claim 8 wherein the system is structured such that a second movable member is positioned between the support element and the opening in the base prior to activation of the tether release system to release the tether.

\* \* \* \* \*

UNITED STATES PATENT AND TRADEMARK OFFICE
CERTIFICATE OF CORRECTION

PATENT NO.         : 8,678,432 B1
APPLICATION NO.    : 13/153339
DATED              : March 25, 2014
INVENTOR(S)        : Quioc et al.

Page 1 of 1

It is certified that error appears in the above-identified patent and that said Letters Patent is hereby corrected as shown below:

In the Specification

Column 3; Line 22;    Please delete the second "that".

Column 4; Line 6;     Please delete "formed" and insert --form--.

Column 10; Line 16;   Please delete "valve" and insert --Valve--.

Column 13; Line 19;   Please delete "min" and insert --arm--.

Column 14; Line 4;    Please insert --"E"-- before pulls.

Column 14; Line 37;   Please delete "valve" and insert --Valve--.

Signed and Sealed this
First Day of July, 2014

Michelle K. Lee
*Deputy Director of the United States Patent and Trademark Office*